United States Patent Office

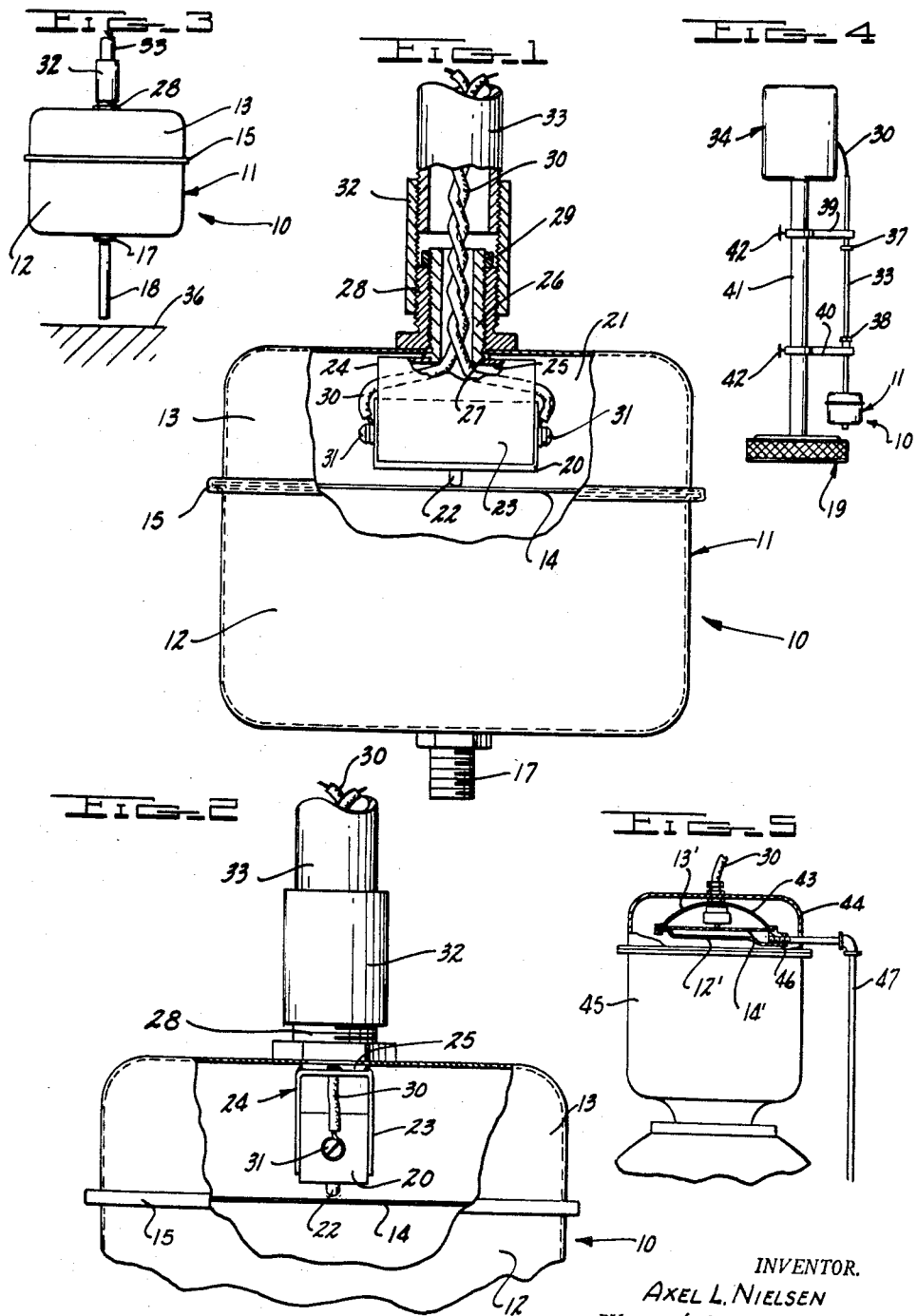

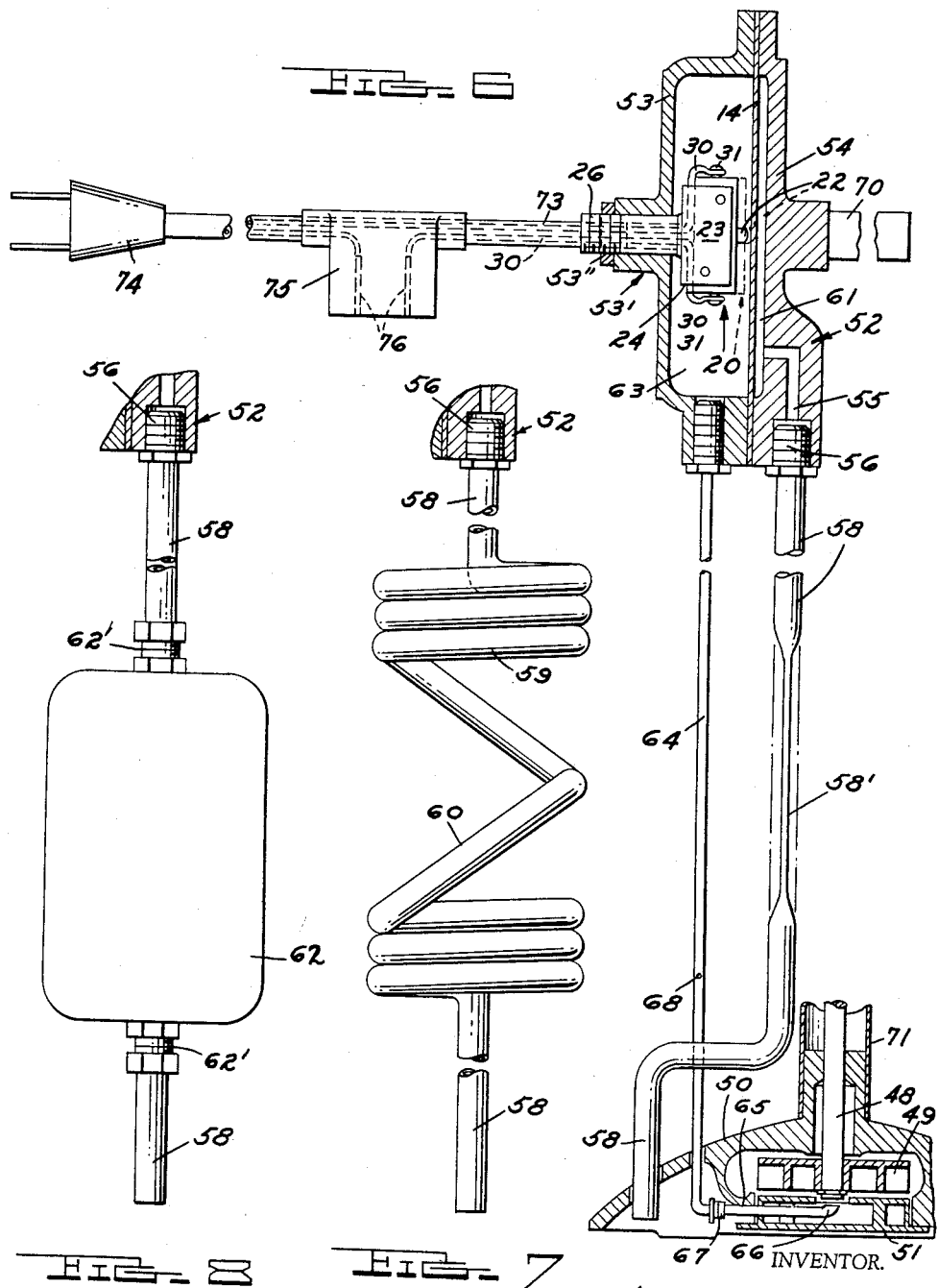

2,922,854
Patented Jan. 26, 1960

2,922,854

SUMP PUMP CONTROL

Axel L. Nielsen, Hazel Park, Mich.

Application September 16, 1957, Serial No. 684,111

17 Claims. (Cl. 200—83)

The present invention relates to an improvement in an electrically operated sump pump or like pump in which the driving motor for the pump may be reliably controlled, as to commencement and termination of its operation in accordance with the rise and fall of liquid in the sump, in a minimum number of operating cycles. This is a continuation-in-part of my copending application, Serial No. 570,730, filed March 12, 1956, now Patent No. 2,834,845, issued May 13, 1958.

It is a general object of the invention to provide a control for such a pump driving motor, which embodies a switch and a flexible diaphragm to control the making and breaking of the motor circuit at the switch, with a desired time lag between the commencement of a rise or fall of the sump's liquid level and the actual actuation of the switch to "make" or "break" condition, respectively. The diaphragm constitutes a top wall of an air-liquid pressure chamber opening downwardly to the sump, which chamber is pneumatically pressurized through the opening in proportion to the height of the liquid level to be controlled as the liquid enters the chamber. The diaphragm and switch are selected and related so as to have contact over a substantial range of pressures in the pressure chamber, during the time lag mentioned, prior to actuation of the control button of the switch from "closed" to "open" position, and vice versa. This minimizes the number of operating cycles required of the pump motor over an extended period in limiting the rise of the liquid in the sump above a predetermined critical height.

In accordance with another object, and as a modified adaptation of the invention, the pressure chamber of the control device is provided with an elongated intake tube in communication therewith at its pressure opening, the tube extending into the sump so that the rise of the liquid therein is attended by a rising column within the tube. This effects a slow and gradual initial compression of air in the pressure chamber, expedited when the liquid enters the chamber, and a resultant flexure of the diaphragm to actuate the switch after the desired time delay. An increased range of lag is made possible by this feature.

It is a specific object of the invention to provide a control device including a well sealed casing which is subdivided by the flexible diaphragm to define a pressure chamber on one side of the latter, the chamber being subject to pressurization in proportion to the level of the sump liquid to be controlled; and in which the casing has an upper, atmospheric pressure chamber in which the switch is mounted in an improved manner. In accordance with the principles of the invention as shown, an elongated upper tubular extension opens downwardly into the atmospheric pressure chamber, through which tubular member atmospheric air is admitted. The tubular extension also serves as a conduit through which the wiring leads of the switch are brought adjacent and connected to the driving motor for the submerged impeller of the pump.

It is an advantageous feature of the invention that the control device may be employed as a float unit directly buoyed by the liquid in the sump, or as a rigidly mounted control casing communicated with the sump liquid through a downward pressure intake tube of the type referred to above. Thus, in accordance with an object of one illustrated embodiment of the invention, the device may be rigidly sustained, as by a connection to its downward tube extension, above the pump impeller sump or pit, or otherwise appropriately held against axial movement; while in accordance with another embodiment the casing of the control device, as buoyantly sustained by the sump liquid, has its vertical movement in response to a rise or drop of the liquid level positively limited by spaced stops to determine the levels at which the actual pressure responsive control action is initiated and terminated.

In accordance with a still further embodiment of the invention, it is an object to provide a structure in which the switch and diaphragm housing of the control device is mounted directly within the elevated housing for the impeller motor. In an installation of this sort, the pressure chamber is communicated with the liquid by an elongated extension tube, and the device of course operates as a fixed unit.

In accordance with another adaptation, it is an object of the invention to provide a motor control as described which may be optionally rendered responsive, on the side of its diaphragm opposite its variable pressure chamber, to the pump impeller intake. Thus the diaphragm may be subjected to pump intake vacuum until the sump is practically dried, the vacuum line maintaining the diaphragm in switch closing position until such time.

More specifically, it is an object of the invention to provide a control which involves a very simple mechanical provision to enable the times of cutting in and cutting out of the motor to be accurately established in accordance with the special requirement of a particular installation. This may be done in one suggested way by flattening the intake tube leading from the sump to the control housing. Thus, a predetermined rise in water level in the sump is of diminished effect in pressurizing the diaphragm of the control as the liquid upwardly enters and traverses the flattened portion of the tube.

As an alternative, regulation of the motor cut-in and cut-out time may be had by incorporating a vertically coiled portion in the intake tube, for a corresponding purpose of producing a desired varying pressurizing effect exerted on the diaphragm by a rising column of water in the intake tube.

As a still further alternative, the invention contemplates the incorporation of a volumetrically enlarged section or chamber in the intake tube, for an equivalent purpose.

Provisions of this sort may be incorporated in a control whose action is augmented, as indicated above, by a vacuum line leading from the pump impeller intake to the side of the control diaphragm opposite its pressurized side. Further, such vacuum line may be controlled as to its effect in the timing of the motor cut-in and cut-out by the provision of a suitable atmospheric bleeder port, as illustrated and described in my co-pending application identified above.

In accordance with a still further object of the invention, the control of motor cut-in and cut-out time may be in part governed by adjustably varying the spacing of the control switch from the pressurized diaphragm.

Generally, it is an object of the invention, without regard to specific features discussed above, to provide a control unit which may be supplied as a part of an original sump pump assembly or may optionally be supplied as an adapter type motor control easily and quickly applied to an existing sump pump to afford perfect control of its motor.

In either sort of installation the unit has the important advantage that it need not be mechanically-mounted on the pump, nor need it be submerged in the sump.

In reference to the general objective stated in the two preceding paragraphs, it is a more specific object to provide a motor control unit, including a diaphragm-operated switch wired to an electrical connector which plugs into a suitable electric outlet, in combination with a further electrical socket connected in series with such connector and switch, into which the usual plug connector of an existing sump pump motor may be plugged.

Thus, the invention provides a unit which, in the event of failure of an existing sump pump control, as by failure of its float or otherwise, may be easily, quickly and inexpensively restored to operation. In doing this, the intake tube of the improved control unit is simply placed in the sump, and the electrical connections referred to above are completed to place the unit in operation.

In summation, it is an object to provide a motor control unit of the sort described, adapted to be embodied as an adapter or replacement device for an existing disabled sump pump, or as a component of original sump pump equipment, which unit is optionally equipped with various improved provisions to regulate the cut-in and cut-out times of the pump motor. These embrace special mechanical provisions in the sump intake tube to alter its pressurizing characteristic, the physical adjustment of the switch in relation to its actuating diaphragm, vacuum provisions effective on the side of the diaphragm opposite the pressurized side, and equivalents thereof.

The foregoing as well as other objects of the invention will become more apparent as this description proceeds, especially when considered in connection with the accompanying drawings, wherein:

Fig. 1 is a fragmentary view, in side elevation, partially broken away and in axial section, illustrating structural details of the improved control device;

Fig. 2 is a fragmentary end elevational view of the device, partially broken away;

Fig. 3 is a fragmentary view showing a modification of the improved device, which is equipped with a pressure tube extension and employed as a fixedly mounted unit;

Fig. 4 is a more or less schematic view in elevation showing the control device in an installation in which the casing of the device acts as a float having positively limited vertical movement;

Fig. 5 is a fragmentary view in elevation, partially broken away and in section, showing the device as embodied directly in a pump motor housing;

Fig. 6 is a fragmentary view, partially broken away and in vertical section through a control unit or device in accordance with a further modified embodiment of the invention, as applied to the impeller section of a conventional sump pump;

Fig. 7 is a fragmentary elevational view of a further modified adaptation of means to vary the effect of a rising intake column in pressurizing the diaphragm of the control; and Fig. 8 is a view similar to Fig. 7 showing a further modification.

Referring to Figs. 1 and 2, the improved control device for a sump pump or the like is generally designated 10. It comprises a well sealed housing or casing 11 of non-corrosive material made up of a lower cup-like shell member 12 of substantial internal volume and an upper inverted cup member 13. A flexible diaphragm 14, which may be of thin spring brass or other suitable material, extends across the entire horizontal or transverse area of the casing 11, being clamped and well sealed marginally at 15 between adjacent registering marginal edges of the casing members 12, 13.

The diaphragm 14 serves as an upper flexible wall of a pressure chamber defined by the diaphragm and the lower casing member 12; and the bottom of the latter is centrally apertured to receive a threaded tubular pressure intake nipple or fitting 17. An elongated pressure tube or tubular extension 18 (as shown in Fig. 3) may thus be threaded on the fitting 17 in air tight relation thereto in the adaptation shown in Fig. 3, to be described. As employed in the form shown in Figs. 1 and 2 (and also in Fig. 4) the casing 11 floats in liquid in the usual sump in which the pump's impeller housing (designated 19 in Fig. 4) is positioned.

An appropriate control switch 20 is mounted within the upper space or chamber 21 within the casing member 13, which space is kept at atmospheric pressure by provisions to be described. Switch 20 is a suitable enclosed, normally open type having a control button 22 positioned directly above the center of the diaphragm 14. The button may be spring urged or the switch may be a reversible snap acting one, but in accordance with the invention, the switch is one in which the button 22, upon engagement by the upwardly flexing diaphragm 14, will be actuated to close an electrical circuit only when a substantial upward force of, say, 20 oz., is exerted on control button 22. Likewise, the switch 20 is chosen so that when this force drops to, say, 3 oz., the switch will return to its normally open condition. This, it will be seen, permits a dwell, delay or lag range of pressures in the pressure chamber below the diaphragm to be built up or diminish between the instants in which the switch 20 is closed and opened, or vice versa.

The switch 20 is appropriately secured between the plate-like arms 23 of an inverted U-shaped mounting bracket 24, which may be in the form of a shaped brass strip, and the upper cross piece 25 of the mounting bracket 24 is secured, as by soldering, to the lower extremity of a tubular mounting fitting 26 coaxially aligned with the switch control button, as indicated in Figs. 1 and 2, which fitting has a bottom shoulder 27 bearing upwardly against the top panel of upper casing member 13 through which fitting 26 extends. It is to the shoulder 27 that the bracket 24 is secured.

A flanged clamp nut 28 is threadedly engaged with the exterior of tubular fitting 26 and bears against the upper surface of casing member 13 to hold the fitting and mounting bracket 24 rigidly in place; and a lock nut 29 is threaded on the fitting over the nut 28.

Conventional wiring leads 30 are applied to switch terminals 31 and the brought inwardly of the U-shaped bracket 24, and upwardly through fitting 26, whence they are lead through an external coupling 32 threaded on the sleeve 28 and a vertically extending, elongated tube 33 threaded into the coupling 32. Tube 33 shields the leads to their electrical connection with the motor of the installation (shown in Fig. 4 and generally designated 34), and the upper end of the tube 33 is left open, so as to communicate the switch chamber 21 above diaphragm 14 with atmosphere.

In operation, with the diaphragm 14 spaced slightly below the switch control button 22, as shown in Figs. 1 and 2, the switch is open and the motor 34 is de-energized. The casing 11 floats in the liquid in the sump or pit, and as the liquid rises therein it increasingly compresses air in the pressure chamber 12, tending to cause diaphragm 14 to flex upwardly into engagement with button 22.

The switch 20 remains in its normally open condition well after force is initially applied to the control button by the diaphragm and exceeds its lower operating limit, i.e., 3 oz. Upon continued rise of the liquid, which may be over a considerable differential in level, the chamber 12 is of course increasingly and substantially proportionately pressurized, so that when the upper critical force on button 22, instanced as 20 oz., is exceeded, the switch 20 closes. The motor 34 is energized to drive an impeller (not shown) in impeller housing 19 to drop the sump liquid level. The motor operates throughout a period determined by the diminishing pressurization of the chamber 12, until the lower critical force on button 22 is passed, whereupon the switch opens.

It is seen from the foregoing that the invention provides a motor control of considerable sensitivity which reliably operates to initiate and terminate motor operation in a minimum number of cycles of switching operation. Motor life is extended and noise annoyance minimized, without sacrifice in any degree of desired reliability.

Fig. 3 of the drawings illustrates a fixed installation of the improved device 10 similar in all respects to the construction shown in Figs. 1 and 2, with the addition of the elongated, downwardly extending pressure intake tube 18 to its threaded intake fitting 17. Accordingly, corresponding reference numerals are employed. Here, the casing 11 is rigidly sustained, as by fixedly clamping its intake tube 18 with its lower open end directly above a concrete floored sump 36, in which the pump impeller (not shown) is also located, in the conventional way.

As mentioned, the use of the intake tube extends the duration of time lag between switch actuations. The column of liquid rising in the tubular member 18 with the rise of the level in the pit will gradually compress air in the pressure chamber 12 until the liquid actually enters the chamber, when the compression increases in rate with ultimate transmission of force by the diaphragm 14 adequate to actuate the switch 20.

Fig. 4 of the drawings illustrates an alternative installation in which the casing 11 of the control is buoyed by liquid in the sump for limited vertical travel. For this purpose, upper and lower stop collars 37, 38 are fixed on the upper tube extension 33 in longitudinally spaced relation to one another. Upper and lower guide and stop brackets 39, 40, respectively, are also fixedly clamped onto the usual elongated shaft housing 41 of the sump pump, within which the motor to impeller shaft (not shown) operates. The open upper end of the tube 33 extends well above the upper guide and stop member or bracket 39.

In the operation of the adaptation shown in Fig. 4, the brackets 39, 40 slidingly guide the tubular extension 33 as the floated casing 11 rises and falls, as buoyed in the sump. When in the position shown, the stop collar 38 rests on bracket 40 to prevent further downard movement of the casing, whereupon the switch 20 therein will be opened when the pressure in its chamber 12 becomes insufficient to hold the switch closed. Upon a rise of the liquid level, the casing 11 is buoyed upward until the stop 37 on tube 33 engages upper guide bracket 39, whereupon increasing pressurization of the chamber 12 occasions a closing of the switch 20 when the upper critical diaphragm force exerted on switch button 22 is exceeded.

The guide and clamp brackets 39, 40 embody adjustable provisions at 42 to enable their axial or vertical spacing to be altered as desired, to thereby alter the vertical distance over which the casing 11 is freely buoyed between operations of the pressure-responsive provisions.

In the further modified embodiment of the invention shown in Fig. 5, structural details of the casing of the control device, here specially designated 43, are altered, inasmuch as the casing is mounted directly within an upper extension dome portion 44 of the usual motor housing 45. Although alterations of the shape of the casing parts are required, the operation is the same. Accordingly, the reference numeral 13' is employed to designate an upper casing member corresponding to the casing member 13, but of mildly domed shape; the reference numeral 12' is employed to designate a lower casing member corresponding to casing member 12, but of considerably reduced internal volume; and the reference numeral 14' designates a flexible diaphragm marginally clamped between the casing members 12', 13'. It is contemplated that the diaphragm 14' may be of a non-metallic material, such as neoprene or equivalent corrosion resistant, non-contaminable flexible material. It coacts with a switch 20 mounted to the upper casing member 13' by provisions which may be similar to those shown in Figs 1 and 2. The casing 43 is in turn supported on the motor dome 44 by appropriate tubular clamp provisions, and the electrical leads 30 brought from switch 20 through these provisions are connected with a motor housing 45 in a conventional way.

The lower pressure casing member 12' has an integral extension 46 into which is tapped a pressure tube or conduit 47 extending down into the pump sump, and the operation of the unit as installed in the embodiment of Fig. 5 is identical with the operation described in the other embodiments, lacking of course, the float features referred to in connection with Fig. 4.

The invention also contemplates the provision of a supplemental means to increase the duration of a pumping cycle until the sump level is dropped to the intake of the pump impeller housing, thereby virtually drying the sump; and provisions of this character are shown in Fig. 6 of the drawings.

As illustrated in Fig. 6 of the drawings, a portion of a vertical motor shaft housing 71 is shown, with a conventionally shown motor driven shaft 48 projecting downwardly therein. Shaft 48 is secured to a pump impeller 49 in an impeller housing 50 beneath the shaft housing. A conventional intake trap 51 is associated beneath the pump impeller housing. A diaphragm and switch housing or casing is generally designated 52.

The housing or casing 52 is constituted by casing members 53, 54 of which the latter provides a downwardly opening pressure passage 55 which threadedly receives a fitting 56. Fitting 56 communicates downwardly through the pressure tube 58 of relatively large internal bore size (which may be modified on installation as hereinafter described) with the sump, at a level adjacent or beneath the trap 51. The second casing member 53 is bell-like in outline, and the flexible sheet brass diaphragm 14 is marginally clamped between the casing members 53, 54. It will be noted that the diaphragm coacts with member 54 in defining a pressure control chamber 61 of relatively small volumetric capacity as compared with a vacuum or control chamber 63 constituted between the casing member 53 and diaphragm 14.

A motor control switch similar to the switch 20 (hence correspondingly designated per se as well as in reference to its parts and its mount on housing 52) is mounted in chamber 63, and a vacuum line 64 extends downwardly from the control chamber, being brought laterally into communication with the intake side of the impeller housing 50. If desired, this communication may be effected by means of a short horizontal tube length 65 extending into the trap 51 and provided with an upturned end 66 coaxial with the intake eye of the impeller housing. A releasable coupling 67 connects the tube length 65 with the vacuum line 64 outwardly of the trap 51.

The vacuum tube or line 64 is chosen of substantially less internal bore size than the pressure tube 58. Likewise, a small bleeder port 68 may be provided in the line 64 at an intermediate elevation thereof.

It is evident that as the level of liquid rises predeterminedly in the pressure and vacuum lines 58, 64, the respective pressure and vacuum chambers 61, 63 will be increasingly pressurized, although not in corresponding ratio. For example, if the larger and smaller bore lines 58 and 64 are of, say $\frac{3}{8}''$ and $\frac{1}{4}''$ tubing, respectively, an identical rise of liquid therein will (in the absence of bleeder port 68) give rise to a pressure reading in chamber 61 of 6½ oz. per square inch, as compared with a reading of 3 oz. per square inch in the other chamber 63. It is evident that the responsivity in flexure of the flexible diaphragm 14 to a given liquid rise is therefore considerably greater than in the opposite direction.

Assuming that the diaphragm 14 has caused the actuation of the button 22 of switch 20 from the dotted line position to the solid line position of Fig. 6, with such increasing imposition of force on the button as to cause switch 20 to close, the pump motor operates impeller 49 and the liquid level falls accordingly, the chamber 63 being subject to the suction at the intake of the impeller. Prior to this, the chamber 63 of the control has been pressurized only upon a rise of the liquid level above the small port 68 in line 64.

As the liquid level falls a partial pressure or vacuum condition becomes effective in chamber 63, which is not materially affected by the small bleeder aperture 68, and this vacuum causes the diaphragm 14 to be held in closing relation to the switch 20. The vacuum is not reduced sufficiently to enable the diaphragm to move away from the switch button and permit the switch to open until the level has dropped beneath the intake, or impeller eye, end of the vacuum line 64. When this occurs, the vacuum in chamber 63 is immediately broken.

The provision of the auxiliary vacuum line 64 is thus seen to constitute a simple and convenient means to materially lengthen the operating cycle of the motor and thus practically dry out the sump before the motor cycle terminates. The optional positioning of the small aperture 68 permits a desired variation in the differential pressurizing of the diaphragm 14 on its opposite sides; and the inverse size proportioning of the larger chamber 63 and smaller vacuum line 64 in relation to the smaller pressure chamber 61 and the larger pressure line 58 affords a further means of timing the installation as to the institution and termination of motor operation.

In reference to Fig. 6, it may be noted that the diaphragm housing or casing 52 is here designed for disposition externally and to one side of a motor housing (not shown), and to this end, a spring clip 70 is affixed to the casing 52 and may snap onto the usual shaft housing 71. However, it will be clear from the foregoing, and it is an important feature of the invention, that the housing or casing 52 need not be mounted to either the pump or its motor, but can be disposed in any convenient location, so long as its pressure tube 58 (and vacuum tube 64 also, if employed) is brought properly into the sump. It follows as another advantage that no part of the housing need be immersed in the sump water.

The control illustrated in Fig. 6 may be, as indicated above, produced as a replacement or adapter unit, for which type of operation the unit has special utility due to certain wiring provisions hereinafter described. The invention as embodied in Fig. 6 also contemplates a modification of the intake tube 58 to the pressurized side of the diaphragm housing or casing 52.

In accordance with this improvement, the tube 58 is, upon installation and proper location relative to the sump, flattened substantially at 58′ over a length which will be determined in accordance with the particular installation, the length occurring intermediate the overall length of the tube 58. The outline of the tube, minus the flattened section 58′, is shown in dot-dash line in Fig. 6.

Thus, as the sump water level rises, water will rise in the full diameter lower section of the tube 58 and, entering the flattened section 58′, its ability to compress air in the chamber 61, for a given increment of water level rise in the sump, is materially diminished. Thus, the interval before the diaphragm 14 operates to close switch 20 is increased, and the pump comes into operation at a later time. The duration of this interval may be controlled by lengthening or shortening the flattened section 58′, or varying its flatness or its location.

The control regulation may also be accomplished by a rotative adjustment of the tubular externally threaded mounting fitting 26 of switch 20, which fitting threads directly in a boss 53′ of switch housing member 53 and is held by a lock nut 53″. By this means the switch button 22 may be positioned variably in relation to diaphragm, thus to regulate the commencement and duration of motor cycles, yet the axial alignment of the button and diaphragm remains unchanged.

In the unit illustrated in Fig. 6 the electrical leads 30 from the switch are brought out through the tubular threaded mounting fitting 26, preferably in the form of a conventional insulated cable 73 leading to a conventional electrical plug-in connector 74, and a type of female electrical socket member 75 is connected in the cable 73 with its socket terminals 76 wired in series with the plug 74 and switch terminals 31. Cable 73 may be of any desired length, so that in applying the control unit as a replacement, all that is necessary to do is to connect the existing electrical motor connector (not shown) of the sump pump in the socket 75, then plug the connector 74 in a suitable electrical outlet socket or box. It is not necessary to make any particular mounting for the control housing 52, and any support on which it may be suspended will suffice. Tubes 58 and 64, if used, are brought to the sump as above described.

Fig. 7 illustrates an alternative type of regulatory provision in the intake tube 58 as a means for determining the cut-in and cut-out time of the pump motor in any particular installation. In this instance, the tube 58 is shaped in a spiral coil 59 of flexible tubing intermediate the top and bottom extremities of the tube. The coil is adapted to be elongated by stretching the same to form the intermediate axially distorted coil portion 60, which in the length of a single coil convolution or two will occupy an axial length much greater than the undistorted coil. Accordingly, a given rise of water level in the sump will be more effective, entering the lower coils 59 and effecting a greater displacement of air for a given liquid rise, than in the uncoiled length. It is then possible, by altering the overall length of the coiled section upon installation, by stretching out the portion 60, to set the motor cut-in and cut-out times as desired. The adaptation of Fig. 7 represents a reversal of the effect of the regulatory means shown in Fig. 6.

Fig. 8 illustrates a further modification operating on the principle of Fig. 7 to accomplish the foregoing purpose. In this instance, an adapter casing or chamber 62 is inserted in the intake tube 58, as by connecting fittings 62′ at the top and bottom of the casing. The enlarged volume of the latter occasions an increased compression of air in the pressure chamber 61, as water rises from the lower end of tube 58 into the adapter casing 62, with a corresponding adjustment of the motor cut-in and cut-out interval.

What I claim as my invention is:

1. A control unit for a sump pump or like motor, comprising a housing having a flexible diaphragm subdividing its interior into pressure and switch control chambers on opposite sides of the diaphragm, an elongated liquid intake tube downwardly communicating pressure chamber with a source of liquid to be pumped, a vacuum line to communicate said control chamber with the intake side of the pump, a switch disposed in said control chamber for actuation by said diaphragm upon pressurization of said pressure chamber, said switch having an operating element facing said diaphragm and operated thereby under the effects of pressure and vacuum in said respective pressure and control chambers, said switch being provided with a threaded mount disposed in coaxial alignment with said operating element, said threaded mount having threaded engagement with said housing for rotative adjustment to variably position said operating element relative to said diaphragm.

2. A control unit for a sump pump or like motor, comprising a housing having a flexible diaphragm subdividing its interior into pressure and switch control chambers on opposite sides of the diaphragm, a liquid intake member downwardly communicating said pressure chamber with a source of liquid to be pumped, a vacuum line to communicate said control chamber with the intake side of the pump, a switch disposed in said control chamber for actuation by said diaphragm upon pressurization of said pressure chamber, said switch having electrical wiring leads connected thereto and an operating element facing said diaphragm, and operated thereby under the effects of pressure and vacuum in said respective pressure and control chambers, said switch being provided with an externally threaded tubular mount disposed in coaxial alignment with said operating element, through which mount said leads extend externally of said housing, said threaded mount having threaded engagement with said housing for rotative adjustment thereon to variably position said operating element relative to said diaphragm, an electrical connector electrically connected with one of said leads, and a further electrical connector electrically connected in series with said first named connector and the other of said leads.

3. A control unit for a sump pump or like motor, comprising a housing having flexible, fluid pressure responsive means defining a pressure and a control chamber on opposite sides of said means, a liquid intake tube downwardly communicating said pressure chamber with a source of liquid to be pumped, a tubular vacuum line communicating said control chamber with the intake side of a pump, said intake tube being of larger internal cross sectional area than said vacuum line and being provided with control means to alter the rate of vertical rise of liquid entering the same from said source, a switch disposed for actuation by said pressure responsive means under pressure in at least one of said chambers, said switch having electrical wiring leads connected thereto and an operating element engageable by said pressure responsive means, and a pair of electrical connectors electrically connected with said leads.

4. A control unit for a sump pump or like motor, comprising a housing having flexible, fluid pressure responsive means defining a pressure chamber, a liquid intake tube downwardly communicating said pressure chamber with a source of liquid to be pumped, said intake tube being provided with control means to alter the rate of vertical rise of liquid entering the same from said source, in the form of a local portion of lesser internal cross sectional area than an adjoining portion, a switch disposed for actuation by said pressure responsive means upon pressurization of said pressure chamber, said switch having electrical wiring leads connected thereto and an operating element engageable by said pressure responsive means, and a pair of electrical connectors electrically connected with said leads.

5. A control unit for a sump pump or like motor, comprising a housing having flexible, fluid pressure responsive means defining a pressure and a control chamber on opposite sides of said means, a liquid intake tube downwardly communicating said pressure chamber with a source of liquid to be pumped, a tubular vacuum line communicating said control chamber with the intake side of a pump, said intake tube being of larger internal cross sectional area than said vacuum line and being provided with control means to alter the rate of vertical rise of liquid entering the same from said source, in the form of a local portion of lesser internal cross sectional area than an adjoining portion, a switch disposed for actuation by said pressure responsive means under pressure in at least one of said chambers, said switch having electrical wiring leads connected thereto and an operating element engageable by said pressure responsive means, and a pair of electrical connectors electrically connected with said leads.

6. A control unit for a sump pump or like motor, comprising a housing having flexible, fluid pressure responsive means defining pressure and control chambers on opposite sides of said means, a liquid intake tube downwardly communicating said pressure chamber with a source of liquid to be pumped, a vacuum line communicating said control chamber with the intake side of a pump, said intake tube being of larger internal cross sectional area than said vacuum line and being provided with control means to alter the rate of vertical rise of liquid entering the same from said source, a switch disposed for actuation by said pressure responsive means under pressure in at least one of said chambers, said switch having an operating element facing and engageable by said pressure responsive means, and means to adjust the position of said operating element relative to said pressure responsive means.

7. A control unit for a sump pump or like motor, comprising a housing having flexible, fluid pressure responsive means defining pressure and control chambers on opposite sides of said means, a liquid intake tube downwardly communicating said pressure chamber with a source of liquid to be pumped, a vacuum line communicating said control chamber with the intake side of a pump, said intake tube being of larger internal cross sectional area than said vacuum line and being provided with control means to alter the rate of vertical rise of liquid entering the same from said source, a switch disposed for actuation by said pressure responsive means under pressure in at least one of said chambers, said switch having electrical wiring leads connected thereto and an operating element facing and engageable by said pressure responsive means, means to adjust the position of said operating element relative to said pressure responsive means, and a pair of electrical connectors electrically connected with said leads.

8. A control unit for a sump pump or like motor, comprising a housing having a flexible diaphragm subdividing its interior into pressure and switch control chambers on opposite sides of the diaphragm, said pressure having a liquid intake tube downwardly communicating the same with a source of liquid to be pumped, a switch disposed for actuation by said diaphragm upon pressurization of said pressure chamber, said switch having electrical wiring leads extending externally of said housing, an electrical connector electrically connected with one of said leads, and a further electrical connector electrically connected in series with said first named connector and the other of said leads, said intake tube being provided with control means to alter threatened rate of vertical rise of liquid entering the same from said source, said control means comprising a locally flattened portion formed in said tube which is of optional length, thickness and position in the tube.

9. A control unit for a sump pump or like motor, comprising a housing having a flexible diaphragm subdividing its interior into pressure and switch control chambers on opposite sides of the diaphragm, said pressure having a liquid intake tube downwardly communicating the same with a source of liquid to be pumped, a switch disposed for actuation by said diaphragm upon pressurization of said pressure chamber, said switch having electrical wiring leads extending externally of said housing, an electrical connector electrically connected with one of said leads, and a further electrical connector electrically connected in series with said first named connector and the other of said leads, said intake tube being provided with control means to alter threatened rate of vertical rise of liquid entering the same from said source, said control means comprising a coil section in said tube having an axially stretched coil portion located optionally in the tube.

10. A control unit for a sump pump or like motor, comprising a housing having flexible diaphragm subdividing its interior into pressure and switch control chambers on opposite sides of the diaphragm, said pressure having a liquid intake tube downwardly communicating the same with a source of liquid to be pumped, a switch disposed for actuation by said diaphragm upon pressurization of said pressure chamber, said switch having electrical wiring leads extending externally of said housing, an electrical connector electrically connected with one of said leads, and a further electrical connector electrically connected in series with said first named connector and the other of said leads, said intake tube being provided with control means to alter threatened rate of vertical rise of liquid entering the same from said source, said control means comprising a liquid receiver of relatively enlarged cross section associated in an intermediate portion of said tube, said receiver downwardly communicating with a lower end of said tube and also with the portion thereof leading to said pressure chamber.

11. A control unit for a sump pump or like motor, comprising a housing having a flexible diaphragm subdividing its interior into pressure and control chambers on opposite sides of the diaphragm, a liquid intake tube downwardly communicating said pressure chamber with a source of liquid to be pumped, said intake tube being provided with control means to alter therein the rate of vertical rise of liquid entering the same from said source, a switch disposed in said control chamber for actuation by said diaphragm upon pressurization of said pressure chamber, said switch having electrical wiring leads and an operating element facing said diaphragm, and being provided with a threaded tubular mount disposed in coaxial alignment with said operating element, through which mount said leads extend externally of said housing, said threaded mount having threaded engagement with said housing for rotative adjustment to variably position said operating element relative to said diaphragm, an electrical connector electrically connected with one of said leads, and a further electrical connector electrically connected in series with said first named connector and the other of said leads, said control means comprising a portion of said intake tube which is of more restricted internal cross sectional area than an adjoining portion thereof.

12. A control unit for a sump pump or like motor, comprising a housing having a flexible diaphragm subdividing its interior into pressure and control chambers on opposite sides of the diaphragm, a liquid intake tube downwardly communicating said pressure chamber with a source of liquid to be pumped, said intake tube being provided with control means to alter therein the rate of vertical rise of liquid entering the same from said source, a switch disposed in said control chamber for actuation by said diaphragm upon pressurization of said pressure chamber, said switch having electrical wiring leads and an operating element facing said diaphragm, and being provided with a threaded tubular mount disposed in coaxial alignment with said operating element, through which mount said leads extend externally of said housing, said threaded mount having threaded engagement with said housing for rotative adjustment to variably position said operating element relative to said diaphragm, an electrical connector electrically connected with one of said leads, and a further electrical connector electrically connected in series with said first named connector and the other of said leads, said control means comprising a portion of said intake tube between the ends thereof which is of more restricted internal cross sectional area than an adjoining portion thereof.

13. A control unit for a sump pump or like motor, comprising a housing having a flexible diaphragm subdividing its interior into pressure and switch control chambers on opposite sides of the diaphragm, a liquid intake member downwardly communicating said pressure chamber with a source of liquid to be pumped, a vacuum line to communicate said control chamber with the intake side of the pump, a switch disposed in said control chamber for actuation by said diaphragm upon pressurization of said pressure chamber, said switch having electrical wiring leads connected thereto and an operating element facing said diaphragm and operated by said diaphragm under the effects of pressure and vacuum in said respective pressure and control chambers, said switch having leads extending externally of said housing, an electrical connector electrically connected with one of said leads, and a further electrical connector electrically connected in series with said first named connector and the other of said leads.

14. A control unit in accordance with claim 13, in which said liquid intake member comprises a liquid intake tube downwardly communicating said pressure chamber with said source of liquid to be pumped, said intake tube being provided with control means in fixed relation thereto to alter therein the rate of vertical rise of liquid entering the same from said source.

15. A control unit in accordance with claim 14, in which said control means comprises a locally flattened portion formed in said tube which is of optional length, thickness and position in the tube.

16. A control unit in accordance with claim 14, in which said control means comprises a coil section in said tube having an axially stretched coil portion located optionally in the tube.

17. A control unit in accordance with claim 14, in which said control means comprises a liquid receiver of relatively enlarged cross section associated in an intermediate portion of said tube, said receiver downwardly communicating with a lower end of said tube and also with the portion thereof leading to said pressure chamber.

References Cited in the file of this patent

UNITED STATES PATENTS

| | | |
|---|---|---|
| 1,959,895 | Bayliss | May 22, 1934 |
| 2,288,436 | Cahan | June 30, 1942 |
| 2,395,657 | Dinsmore | Feb. 26, 1946 |
| 2,480,827 | Armstrong | Sept. 6, 1949 |
| 2,481,612 | Nicholson | Sept. 13, 1949 |
| 2,514,632 | Flubacker | July 11, 1950 |
| 2,633,509 | Fields | Mar. 31, 1953 |
| 2,635,546 | Enyeart et al. | Apr. 21, 1953 |
| 2,640,977 | Parisi | June 2, 1953 |
| 2,680,168 | Murphy | June 1, 1954 |
| 2,722,580 | Hasselhorn et al. | Nov. 1, 1955 |
| 2,752,582 | Cargill | June 26, 1956 |
| 2,794,088 | Ostby | May 28, 1957 |